(12) United States Patent
Chen et al.

(10) Patent No.: US 8,776,220 B2
(45) Date of Patent: Jul. 8, 2014

(54) PHISHING DETECTING SYSTEM AND METHOD OPERATIVE TO COMPARE WEB PAGE IMAGES TO A SNAPSHOT OF A REQUESTED WEB PAGE

(75) Inventors: Shih-Jen Chen, Tucheng (TW); Chien-Ting Kuo, Taichung (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 13/314,360

(22) Filed: Dec. 8, 2011

(65) Prior Publication Data
US 2013/0097700 A1 Apr. 18, 2013

(30) Foreign Application Priority Data
Oct. 18, 2011 (TW) .............................. 100137753 A

(51) Int. Cl.
*G06F 21/00* (2013.01)
*H04L 29/06* (2006.01)

(52) U.S. Cl.
CPC .......... *H04L 63/126* (2013.01); *H04L 63/1483* (2013.01)
USPC .............. 726/22; 382/181; 713/162; 709/224

(58) Field of Classification Search
CPC ............. H04L 63/1483; G06F 21/316; H04M 2215/0148
USPC .......................................................... 726/22
See application file for complete search history.

(56) References Cited

U.S. PATENT DOCUMENTS

| 7,958,555 | B1 * | 6/2011 | Chen et al. ...................... 726/22 |
| 8,108,371 | B2 * | 1/2012 | Dharmarajan et al. ........ 707/705 |
| 8,175,387 | B1 * | 5/2012 | Hsieh et al. .................... 382/181 |
| 2006/0069697 | A1 * | 3/2006 | Shraim et al. ................. 707/102 |
| 2007/0130327 | A1 * | 6/2007 | Kuo et al. ..................... 709/224 |
| 2008/0046738 | A1 * | 2/2008 | Galloway et al. ............. 713/176 |
| 2012/0144481 | A1 * | 6/2012 | Manianchira et al. .......... 726/22 |

* cited by examiner

*Primary Examiner* — Hadi Armouche
*Assistant Examiner* — Bryan Wright
(74) *Attorney, Agent, or Firm* — McClure, Qualey & Rodack, LLP

(57) ABSTRACT

A phishing detecting method includes: a web-page accessing request for accessing a target web page at a target address is received; the target web page from the target address is obtained; the target web page is snapshotted to obtain a present page snapshot; the present page snapshot is compared with several pre-stored page snapshots stored in a database, wherein each of the pre-stored page snapshots corresponds to a pre-stored address; if the present page snapshot matches one of the pre-stored page snapshots, the target address is compared with the pre-stored address, corresponding pre-stored page snapshot of which matches the present page snapshot; if the target address does not match the pre-stored address, the corresponding pre-stored page snapshot of which matches the present page snapshot, it is determined that the target web page is a phishing web page.

6 Claims, 3 Drawing Sheets

PHISHING DETECTING SYSTEM AND METHOD OPERATIVE TO COMPARE WEB PAGE IMAGES TO A SNAPSHOT OF A REQUESTED WEB PAGE

RELATED APPLICATIONS

This application claims priority to Taiwan Application Serial Number 100137753, filed Oct. 18, 2011, which is herein incorporated by reference.

BACKGROUND

1. Technical Field

The present invention relates to a phishing detecting method, a network apparatus applying the method and a computer-readable storage medium with a computer program to execute the method. More particularly, the present invention relates to a phishing detecting method utilizing snapshot, a network apparatus applying the method and a computer-readable storage medium with a computer program to execute the method.

Description of Related Art

Phishing is a way of attempting to acquire information such as usernames, passwords, and credit card details by masquerading as a trustworthy entity in an electronic communication. For example, phishing network pages often claims that they are from famous social networking web pages (for example, YouTube®, Facebook®, MySpace®), bidding web pages (for example, ebay®), network banks, e-commerce web pages (for example, PayPal®), network management web pages (for example, Yahoo®, network service providers, companies, inctutions institutions) for users to trust them. Subsequently, users are directed to a web page, which is similar to the web site they claim. Even if authorization utilizing Secure Sockets Layer (SSL) protocol, it is hard to identify if web pages are fake or not.

Most phishing detecting methods utilize black lists to identify if a web page is a phishing page. However, hackers may utilize several different addresses for phishing. That is, even if a web address for phishing is listed into a black list, hackers can still utilize other web addresses not in the black list for phishing attack. As a result, phishing web pages cannot be filtered precisely utilizing the black lists, especially for phishing web pages at new web addresses.

SUMMARY

According to one embodiment of this invention, a phishing detecting method is provided to determine if a target web page is a phishing web page according to its snapshot and address. The phishing detecting method may take the form of a computer program product stored on a computer-readable storage medium having computer-readable instructions embodied in the medium. The phishing detecting method includes the following steps:

(a) a web-page accessing request for accessing a target web page at a target address is received.

(b) the target web page from the target address is obtained.

(c) the target web page is snapshotted to obtain a present page snapshot.

(d) the present page snapshot is compared with several pre-stored page snapshots stored in a database. Each of the pre-stored page snapshots corresponds to a pre-stored address.

(e) if the present page snapshot matches one of the pre-stored page snapshots, the target address is compared with the pre-stored address, corresponding pre-stored page snapshot of which matches the present page snapshot.

(f) if the target address does not match the pre-stored address, the corresponding pre-stored page snapshot of which matches the present page snapshot, it is determined that the target web page is a phishing web page.

According to another embodiment of this invention, a network apparatus is provided to determine if a target web page is a phishing web page according to its snapshot and address. The network apparatus includes a network card, a database and a processing unit. The processing unit is electrically connected with the network card and the database. The network card builds a connection with a network. The database stores several pre-stored page snapshots. Each of the pre-stored page snapshots corresponds to a pre-stored address. The processing unit includes a request receiving module, a web-page obtaining module, a snapshot obtaining module, a snapshot comparing module, an address comparing module and a noticing module. The request receiving module receives a web-page accessing request for accessing a target web page at a target address. The web-page obtaining module obtains the target web page from the target address through the network. The snapshot obtaining module snapshots the target web page to obtain a present page snapshot. The snapshot comparing module compares the present page snapshot with the pre-stored page snapshots stored in the database. If the present page snapshot matches one of the pre-stored page snapshots, the address comparing module compares the target address with the pre-stored address, corresponding pre-stored page snapshot of which matches the present page snapshot. If the target address does not match the pre-stored address, the corresponding pre-stored page snapshot of which matches the present page snapshot, the noticing module determines that the target web page is a phishing web page and generates a notice signal.

The present invention can achieve many advantages. If a target web page is a phishing web page is determined according to the snapshot and the address of the target web page. Even if several different web addresses are utilized for a phishing attack, if a target web page is a phishing web page can still be determined according to the corresponding relation between the snapshot and the address.

These and other features, aspects, and advantages of the present invention will become better understood with reference to the following description and appended claims. It is to be understood that the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
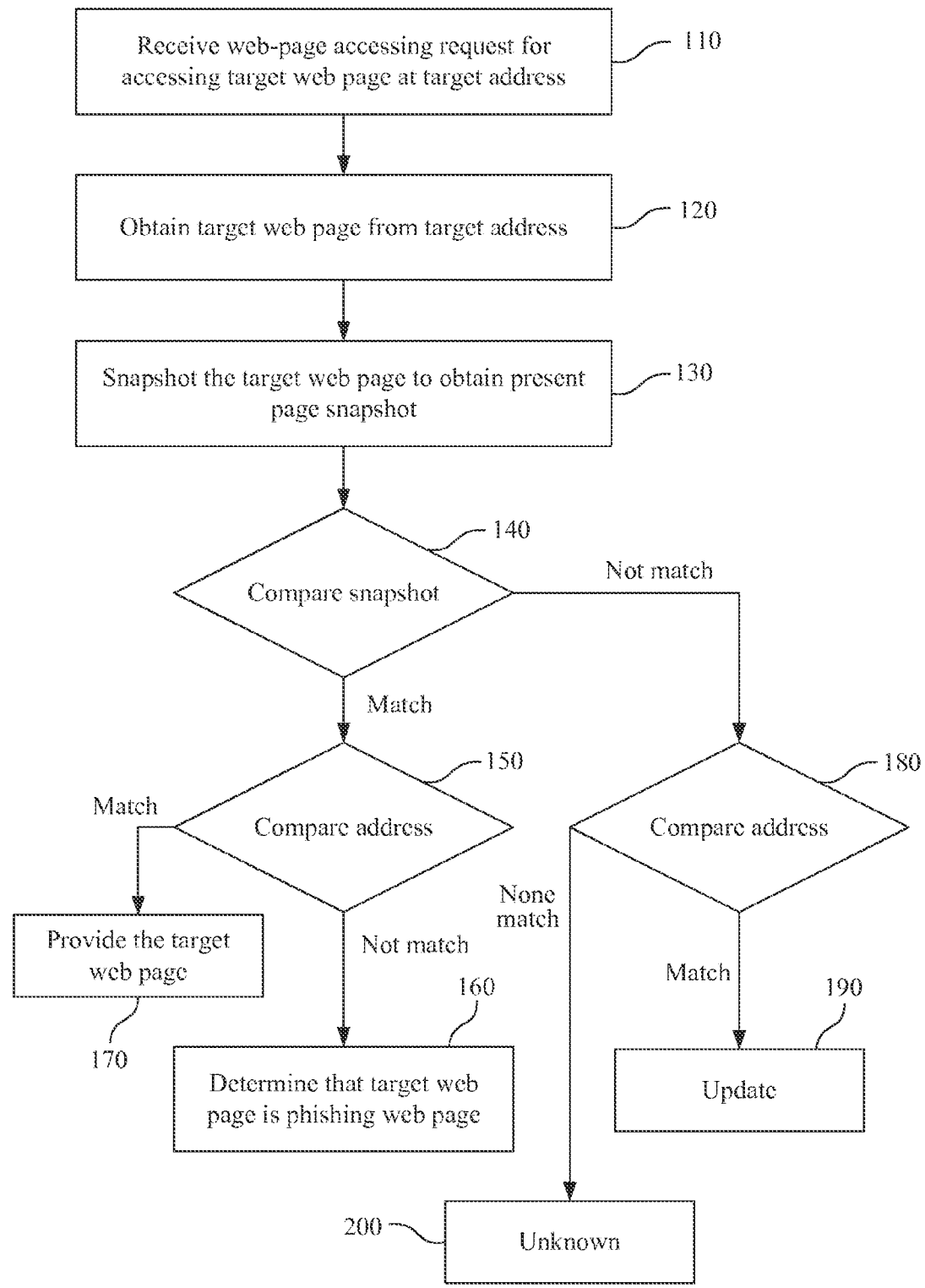
FIG. 1 is a flow diagram of a phishing detecting method according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a flow diagram will be described that illustrates a phishing detecting method according to one embodiment of this invention. In the phishing detecting method, if a target web page is a phishing web page is determined according to snapshot and address of the target web page. The phishing detecting method may take the form of a computer program product stored on a computer-readable storage medium having computer-readable instructions embodied in the medium. Any suitable storage medium may be used. In some embodiments, such suitable storage medium may be a non-transitory computer readable storage medium including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives. In other embodiments, other suitable storage mediums may be used, which should not be limited in this disclosure.

The routine for the phishing detecting method starts at operation 110, where a web-page accessing request for accessing a target web page at a target address is received. In one embodiment of operation 110, the web-page accessing request is received from a client apparatus through a network. In another embodiment of operation 110, the web-page accessing request is received through a user interface, such as a mouse, a keyboard, a touch screen, at least one button, a graphical user interface (GUI) or any other user interface. In other words, a user may operate a user interface to select a target web page, such that the user interface may generate a corresponding web-page accessing request for operation 110 to receive.

The routine continues to operation 120, where the target web page from the target address is obtained.

From operation 120, the routine continues to operation 130, where the target web page is snapshotted to obtain a present page snapshot.

The routine continues to operation 140, where the present page snapshot is compared with several pre-stored page snapshots stored in a database. Each of the pre-stored page snapshots corresponds to a pre-stored address.

If the present page snapshot matches one of the pre-stored page snapshots, the routine continues to operation 150, where the target address is compared with the pre-stored address, corresponding pre-stored page snapshot of which matches the present page snapshot. In one embodiment of this invention, a similarity threshold can be pre-set. Hence, if the similarity between the present page snapshot and one of the pre-stored page snapshots is higher than the similarity threshold, it is determined match.

If the target address does not match the pre-stored address, the corresponding pre-stored page snapshot of which matches the present page snapshot, the routine continues to operation 160, where it is determined that the target web page is a phishing web page. In one embodiment of this invention, if it is determined that the target web page is a phishing web page (operation 160), a notice signal may be generated to notice users that the target web page is a phishing web page. In another embodiment of this invention, if it is determined that the target web page is a phishing web page (operation 160), the target web page may be blocked without providing to users. In other embodiments of this invention, if it is determined that the target web page is a phishing web page (operation 160), other operations may be executed, which should not be limited in this disclosure. Therefore, if a target web page is a phishing web page can be determined according to the snapshot and the address of the target web page. Even if several different web addresses are utilized for a phishing attack, if a target web page is a phishing web page can still be determined according to the corresponding relation between the snapshot and the address.

If operation 150 determines that the target address matches the pre-stored address, the corresponding pre-stored page snapshot of which matches the present page snapshot, the routine continues to operation 170, where the target web page is provided. In one embodiment of operation 170, the target web page can be provided to a display unit for display. In another embodiment of operation 170, the target web page can be provided to the client apparatus, which requests for it.

If operation 140 determines that the present page snapshot matches none of the pre-stored page snapshots, the routine continues to operation 180, where if the target address matches the pre-stored addresses stored in the database is determined.

If operation 180 determines that the target address matches one of the pre-stored addresses, the routine continues to operation 190, where the present page snapshot is utilized to update the pre-stored page snapshot, corresponding pre-stored address of which matches the target address. Therefore, even if the target web page is updated, the phishing detecting method can work as well.

If operation 180 determines that the target address matches none of the pre-stored addresses, the routine continues to operation 200, where the target web page is an unknown web page.

Figure 2:
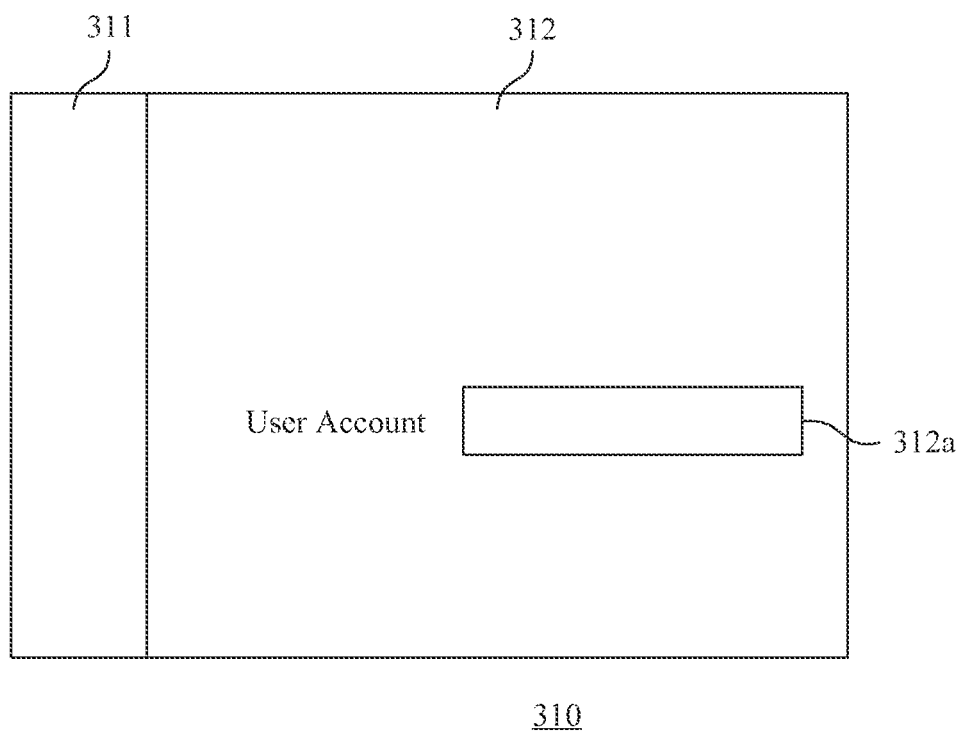
FIG. 2 illustrates an example of a target web page.

In one embodiment of operation 130, only the region with an information input interface would be snapshotted. Hence, at operation 130, an input-interface region, which includes an information input interface, may be captured from the target web page. In practical, source codes corresponding to information input interfaces may be searched from the source codes of the target web page. Subsequently, the input-interface region of the target web page may be snapshotted as the present page snapshot. FIG. 2 illustrates an example of a target web page. In this example, the target web page 310 includes several regions 311, 312. The region 312 includes an information input interface 312a for inputting a user account, and hence is taken as an input-interface region. Subsequently, the routine may only snapshot the region 312 and taken as the present page snapshot. In other embodiments, other interfaces for inputting users' passwords, users' names, users' gender, users' addresses or other information about users. Therefore, only part of the target web page would be snapshotted, which needs less time. In addition, even if region other than the input-interface region differs, the phishing detecting method would not be affected. In other words, the phishing detecting method can be applied to the web page including dynamic information region.

In some embodiments, a hash function can be utilized for address comparisons. Hence, the database may store a pre-stored-address hash value of each of the pre-stored addresses. In one embodiment of operation 150, a hash function may be utilized to calculate a target-address hash value of the target address. The target-address hash value of the target address may be compared with the pre-stored-address hash value of the pre-stored address, the corresponding pre-stored page snapshot of which matches the present page snapshot. If they are not equal, it is determined that the target address does not match the pre-stored address, the corresponding pre-stored page snapshot of which matches the present page snapshot. If they are equal, it is determined that the target address matches the pre-stored address, the corresponding pre-stored page snapshot of which matches the present page snapshot. Therefore, the storage space of the database for storing the pre-stored addresses can be reduced.

In another embodiment of operation 150, the target address may be normalized, and the normalized target address may be compared with the pre-stored address, the corresponding pre-stored page snapshot of which matches the present page snapshot. For example, if the target address is "https://www-.google.com/accounts/ServiceLogin?service=blogger&passive=1209600&continue=http://www.blogger.com/home&followup=http://www.blogger.com/home<mpl=start", the normalized target address may include characteristic characteristic strings "https://www.google.com/accounts/ServiceLogin?", "service=blogger"and "continue=http://www.blogger.com/home" for address comparison. Therefore, address comparison may be done with high precision. In other embodiments, address comparison can be done with other methods, which should not be limited in this disclosure.

Figure 3:
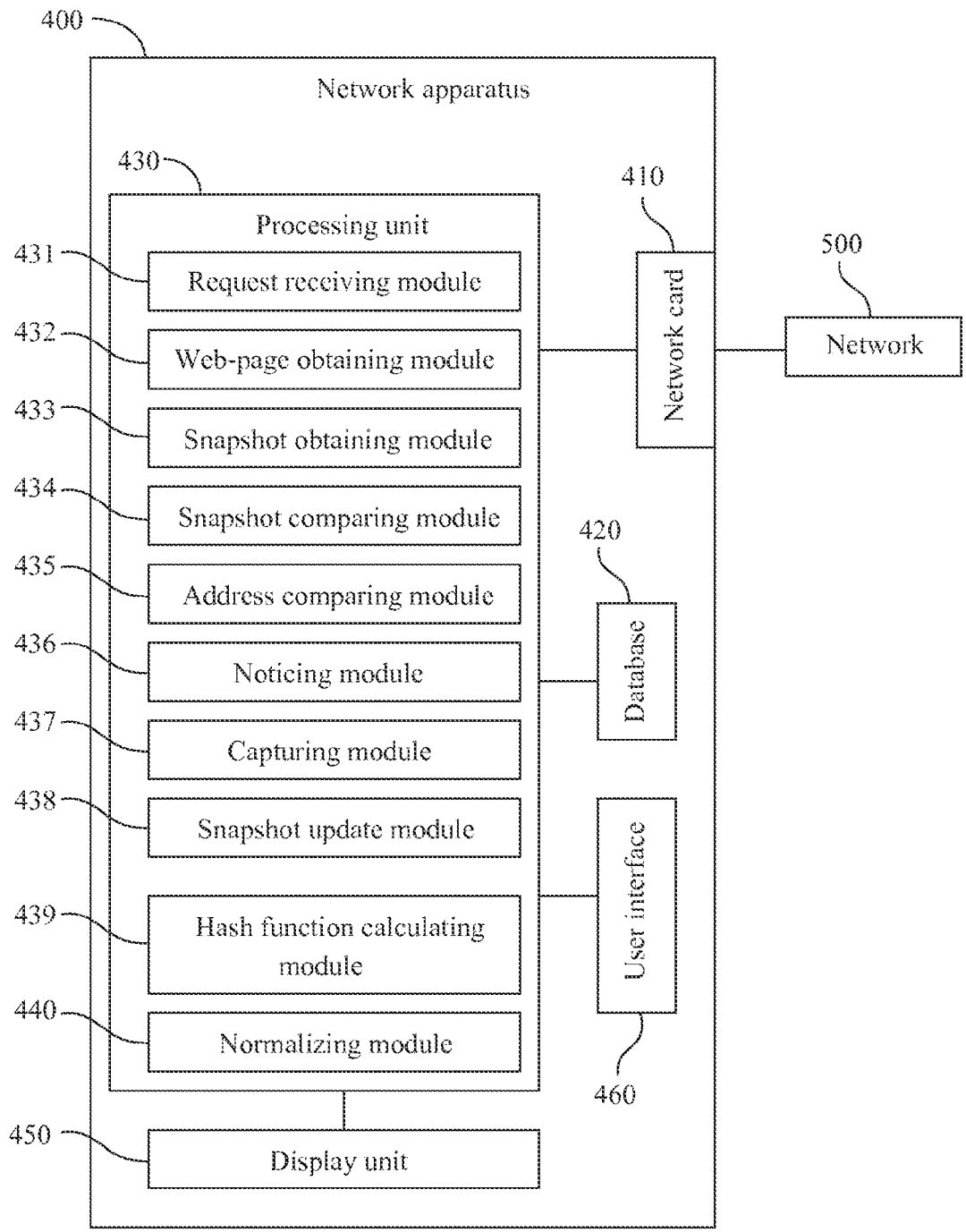
FIG. 3 illustrates a block diagram of a network apparatus according to an embodiment of this invention.

Referring to FIG. 3, a block diagram will be described that illustrates a network apparatus according to an embodiment of this invention. The network apparatus is provided to determine if a target web page is a phishing web page according to snapshot and address of the target web page.

The network apparatus 400 includes a network card 410, a database 420 and a processing unit 430. The processing unit 430 is electrically connected with the network card 410 and the database 420. The network card 410 builds a connection with a network 500. The database 420 stores several pre-stored page snapshots. Each of the pre-stored page snapshots stored in the database 420 corresponds to a pre-stored address.

The processing unit 430 includes a request receiving module 431, a web-page obtaining module 432, a snapshot obtaining module 433, a snapshot comparing module 434, an address comparing module 435 and a noticing module 436. The request receiving module 431 receives a web-page accessing request for accessing a target web page at a target address. In one embodiment of this invention, the request receiving module 431 may receive the web-page accessing request from a client apparatus through the network 500. In another embodiment of this invention, the request receiving module 431 may receive the web-page accessing request through a user interface 460 of the network apparatus 400. The user interface 460 may be a mouse, a keyboard, a touch screen, at least one button, a GUI or any other user interface. In other words, a user may operate the user interface 460 to select a target web page, such that the user interface 460 may generate a corresponding web-page accessing request.

The web-page obtaining module 432 obtains the target web page from the target address through the network 500. The snapshot obtaining module 433 snapshots the target web page to obtain a present page snapshot. The snapshot comparing module 434 compares the present page snapshot with the pre-stored page snapshots stored in the database 420. If the present page snapshot matches one of the pre-stored page snapshots, the address comparing module 435 compares the target address with the pre-stored address, corresponding pre-stored page snapshot of which matches the present page snapshot. If the target address does not match the pre-stored address, the corresponding pre-stored page snapshot of which matches the present page snapshot, the noticing module 436 determines that the target web page is a phishing web page. Subsequently, the noticing module 436 generates a notice signal, such as a sound, words, a light signal or any other notice signal. In one embodiment of this invention, if the noticing module 436 determines that the target web page is a phishing web page, the processing unit 430 may block the target web page without providing to users. In other embodiments of this invention, if the noticing module 436 determines that the target web page is a phishing web page, the processing unit 430 may execute other operations, which should not be limited in this disclosure. Therefore, the network apparatus 400 can determine if a target web page is a phishing web page can according to the snapshot and the address of the target web page. Even if several different web addresses are utilized for a phishing attack, the network apparatus 400 can still determine if a target web page is a phishing web page according to the corresponding relation between the snapshot and the address.

If the address comparing module 435 determines that the target address matches the pre-stored address, the processing unit 430 may drive a display unit 450 of the network apparatus 400 to display the target web page. In another embodiment of this invention, if the address comparing module 435 determines that the target address matches the pre-stored address, the processing unit 430 drives the network card 410 to transmit the target web page to the client apparatus, which transmits the web-page accessing request, through the network 500.

In addition, if the web page is updated, the pre-stored page snapshots stored in the database 420 may differ. Hence, the processing unit 430 may further includes a snapshot update module 438. If the present page snapshot matches none of the pre-stored page snapshots, the snapshot update module 438 determines if the target address matches the pre-stored addresses stored in the database 420. If the target address matches one of the pre-stored addresses, the snapshot update module 438 utilizes the present page snapshot to update the pre-stored page snapshot, corresponding pre-stored address of which matches the target address, in the database 420.

The processing unit 430 may further include a capturing module 437. The capturing module 437 captures an input-interface region, which includes an information input interface, from the target web page. Subsequently, the snapshot obtaining module 433 snapshots the input-interface region of the target web page to be taken as the present page snapshot. Therefore, the time for snapshot can be reduced. In addition, even if region other than the input-interface region differs, the network apparatus 400 would not be affected. In other words, the network apparatus 400 can do phishing detection on the web page including dynamic information region.

To reduce needed storage space for the database 420, the database 420 may store the pre-stored addresses in form of hash values. Hence, the processing unit 430 may further include a hash function calculating module 439. The hash function calculating module 439 utilizes a hash function to calculate a target-address hash value of the target address. The address comparing module 435 compares the target-address hash value of the target address with the pre-stored-address hash value of the pre-stored address, the corresponding pre-stored page snapshot of which matches the present page snapshot. If they are not equal, the notice module 436 determines that the target address does not match the pre-stored address, the corresponding pre-stored page snapshot of which matches the present page snapshot. If they are equal, the notice module 436 determines that the target address matches the pre-stored address, the corresponding pre-stored page snapshot of which matches the present page snapshot.

The processing unit 430 may further include a normalizing module 440 for normalizing the target address. Hence, the address comparing module 435 may compare the normalized target address with the pre-stored address, the corresponding pre-stored page snapshot of which matches the present page snapshot. For example, if the target address is "https://www.google.com/accounts/ServiceLogin?service=blogger&passive=1209600&continue=http://www.blogger.com/home&followup=http://www.blogger.com/home<mpl=start", the normalizing module 440 may normalize the target address to the form including charaterictic characteristic strings "https://www.google.com/accounts/ServiceLogin?", "service=blogger"and "continue=http://www.blogger.com/home" for address comparison. Therefore, address comparison may be done with high precision. In other embodiments, address comparison can be done with other methods, which should not be limited in this disclosure.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A phishing detecting method comprising:
    (a) receiving a web-page accessing request for accessing a target web page at a target address;
    (b) obtaining the target web page from the target address;
    (c) snapshoting the target web page to obtain a present page snapshot;
    (d) comparing the present page snapshot with a plurality of pre-stored page snapshots stored in a database, wherein each of the pre-stored page snapshots corresponds to a pre-stored address;
    (e) if the present page snapshot matches one of the pre-stored page snapshots, comparing the target address with the pre-stored address, corresponding pre-stored page snapshot of which matches the present page snapshot;
    (f) if the target address does not match the pre-stored address, the corresponding pre-stored page snapshot of which matches the present page snapshot, determining that the target web page is a phishing web page.
    (g) if the present page snapshot matches none of the pre-stored page snapshots, determining if the target address matches the pre-stored addresses; and
    (h) if the target address matched one of the pre-stored addresses, utilizing the present page snapshot to update the pre-stored page snapshot, corresponding pre-stored address of which matches the target address,
    wherein when the present page snapshot matches one of the pre-stored page snapshots, and the target address matches the pre-stored address, the corresponding pre-stored pages snapshot of which matches the present page snapshot, the target web page is displayed in a display.

2. The phishing detecting method of claim 1 further comprising:
    if the target address matches the pre-stored address, the corresponding pre-stored page snapshot of which matches the present page snapshot, providing the target web page.

3. The phishing detecting method of claim 1, wherein the operation (c) comprises:
    capturing an input-interface region, which comprises an information input interface, from the target web page; and
    snapshoting the input-interface region of the target web page to be taken as the present page snapshot.

4. The phishing detecting method of claim 1, wherein the database stores a pre-stored-address hash value of each of the pre-stored addresses, the operation (e) comprises:
    utilizing a hash function to calculate a target-address hash value of the target address; and
    comparing the target-address hash value of the target address with the pre-stored-address hash value of the pre-stored address, the corresponding pre-stored page snapshot of which matches the present page snapshot, wherein if the target-address hash value of the target address is not equal to the pre-stored-address hash value of the pre-stored address, the corresponding pre-stored page snapshot of which matches the present page snapshot, it is determined that the target address does not match the pre-stored address, the corresponding pre-stored page snapshot of which matches the present page snapshot.

5. The phishing detecting method of claim 1, wherein the operation (e) comprises:
    normalizing the target address; and
    comparing the normalized target address with the pre-stored address, the corresponding pre-stored page snapshot of which matches the present page snapshot.

6. A computer readable storage medium with a computer program to execute a phishing detecting method, wherein the phishing detecting method comprises:
    (a) receiving a web-page accessing request for accessing a target web page at a target address;
    (b) obtaining the target web page from the target address;
    (c) snapshoting the target web page to obtain a present page snapshot;
    (d) comparing the present page snapshot with a plurality of pre-stored page snapshots stored in a database, wherein each of the pre-stored page snapshots are not from snapshots phishing web pages, and each of the pre-stored page snapshots has a pre-stored address;
    (e) after the present page snapshot matches one of the pre-stored page snapshots, comparing the target address with the pre-stored address, corresponding pre-stored page snapshot of which matches the present page snapshot;
    (f) if the target address does not match the pre-stored address, the corresponding pre-stored page snapshot of which matches the present page snapshot, determining that the target web page is a phishing web page;
    (g) if the present page snapshot matches none of the pre-stored page snapshot, determining if the target address matches the pre-stored address; and
    (h) if the target address matches one of the pre-stored addresses, utilizing the present page snapshot to update the pre-stored page snapshot, corresponding pre-stored address of which matches the target address,
    wherein when the present page snapshot matches one of the pre-stored page snapshots, and the target address matches the pre-stored address, the corresponding pre-stored page snapshot of which matches the present page snapshot, the target web page is displayed in a display.

* * * * *